United States Patent
Gaiser

(12) 
(10) Patent No.: US 6,725,718 B2
(45) Date of Patent: Apr. 27, 2004

(54) METHOD AND DEVICE FOR THE COARSE DIFFERENTIATION BETWEEN A LIQUID OR A BULK MATERIAL OF A FILLING PRODUCT PRESENT IN A RECEPTACLE

(75) Inventor: Martin Gaiser, Alpirsbach (DE)

(73) Assignee: Vega Grieshaber KG (DE)

( * ) Notice: Subject to any disclaimer, the term of this patent is extended or adjusted under 35 U.S.C. 154(b) by 0 days.

(21) Appl. No.: 10/072,104

(22) Filed: Feb. 8, 2002

(65) Prior Publication Data
US 2002/0148296 A1 Oct. 17, 2002

Related U.S. Application Data
(60) Provisional application No. 60/270,239, filed on Feb. 22, 2001.

(30) Foreign Application Priority Data
Feb. 8, 2001 (DE) .......................................... 101 05 652

(51) Int. Cl.[7] .............................................. G01F 23/28
(52) U.S. Cl. .................................................... 73/290 V
(58) Field of Search .......................... 73/290 V, 290 B; 367/99; 181/124; 702/25; 340/617; G01F 23/28

(56) References Cited

U.S. PATENT DOCUMENTS

| | | | |
|---|---|---|---|
| 4,114,441 A | * 9/1978 | Magri | ........................ 73/290 V |
| 4,121,094 A | * 10/1978 | DiVito et al. | .................. 377/24 |
| 4,641,083 A | 2/1987 | Ohno et al. | |
| 4,794,337 A | * 12/1988 | Twieg | ........................ 324/309 |
| 5,614,911 A | 3/1997 | Otto et al. | |
| 5,629,706 A | 5/1997 | Bååth | |
| 6,047,598 A | 4/2000 | Otto et al. | |
| 6,212,943 B1 | * 4/2001 | Maltby et al. | ............. 73/61.49 |

FOREIGN PATENT DOCUMENTS

| | | |
|---|---|---|
| DE | 43 32 071 | 3/1995 |
| DE | 44 07 369 | 9/1995 |
| EP | 1 039 273 | 9/2000 |
| GB | 2 123 237 | 1/1984 |
| JP | 60013009 | 1/1985 |
| WO | WO 01/88489 | 11/2001 |

OTHER PUBLICATIONS

M.I. Skolnik, "Introduction to Radar Systems", McGraw–Hill, Inc., Second Ed., 1980, pp. 53–54.
P. Devine., "Radar Level Measurement—The User's Guide", Vega Controls, Ltd., 2000, pp. 287–293.

* cited by examiner

Primary Examiner—Hezron Williams
Assistant Examiner—Katina Wilson
(74) Attorney, Agent, or Firm—Fay Kaplun & Marcin, LLP

(57) ABSTRACT

Described is a method for a coarse differentiation between a liquid and a bulk material of a filling material present in a receptacle using a filling level measuring device that scans a reflected echo signal. The coarse differentiation is made in dependence on the width of the individual echoes of an envelope curve in an echo signal. Alternatively, the coarse differentiation may also be made in dependence on the number of equidistant echoes in an echo signal, or in dependence on the detection of a stirring apparatus. All these alternatives may also be combined with each other. Also described are devices and filling level measuring devices configured for the realization of the methods.

21 Claims, 6 Drawing Sheets

METHOD AND DEVICE FOR THE COARSE DIFFERENTIATION BETWEEN A LIQUID OR A BULK MATERIAL OF A FILLING PRODUCT PRESENT IN A RECEPTACLE

This application claims the benefit of Provisional application Ser. No. 60/270,239, filed Feb. 22, 2001.

TECHNICAL FIELD

The presence invention relates in general to a method for the automatic coarse differentiation between a liquid or a bulk material of a filling product present in a receptacle by analyzing an echo signal, in particular by analyzing the therefrom generated envelope curve of a filling level measuring device. The present invention further relates in general to devices for the automatic coarse differentiation between a liquid or a bulk material of a filling product present in a receptacle by analyzing an echo signal, in particular by analyzing the therefrom generated envelope curve, as well as filling level measuring devices working in particular on the pulse echo principle and scanning a reflected echo signal.

Filling level measuring devices working on the pulse echo principle and scanning a reflected echo signal, generate from the scanned echo signal a series of data for each echo in the echo image or the so-called envelope curve. Generating an envelope curve from echo signals is sufficiently known and, accordingly, further explanations as to this technology are not required here (cf., for example, German Patent DE 44 07 369 C2; M. Scholnik "Introduction to Radar Systems", $2^{nd}$ edition, 1980, McGraw-Hill; Peter Devine "Radar level measurement—the user's guide", VEGA Controls Ltd., 2000, ISBN 0-9538920-0-X).

BACKGROUND INFORMATION

Conventional filling level measuring devices or sensors detect the filling level by measuring individual echoes in the envelope curve. A method for the filling level measurement according to the radar principle is described in European Patent Application EP 1 039 273 A1, by means of which a non-planar, in particular arched bottom can be determined by examining the measurement signal or the envelope curve for a typical noise signal behavior. When this typical noise signal behavior is determined, the empty state of the receptacle is detected. A characteristic feature for the noise signal behavior of the measurement signal consists in erratic random changes of the local peaks or in an increasing amplitude of the local minimum or maximum points with a rising frequency. German Patent DE 43 32 071 A1 described a method for the filling level measurement according to the radar principle is known, wherein the actual echo function is compared to memorized undisturbed echo function, which corresponds to an undisturbed measurement, and deviations ascertained in the antenna zone and the short range following the antenna, are evaluated for recognizing an initial formation and/or other disturbances. Furthermore, Great Britain Patent Application GB 2 123 237 A shows a filling level detector working with microwaves, which does not work according to the echo principle, but causes the reflected beam to interfere with a beam branched off using a waveguide.

With the conventional devices, it is, however, necessary for improving the evaluation of the envelope curve, to manually input whether the filling product to be measured is a liquid or a bulk material. Through this manual input, the type of the envelope curve measurement, and hence the determination of the filling level, is changed. Thus, if it is predetermined that the filling product is a liquid, the amplitude to be measured is placed at a predetermined amplitude before the maximum of the envelope curve with prior art. In case the operator has predetermined that the filling product is a bulk material, the beginning of the envelope curve up to the maximum is measured as the amplitude to be measured.

In summary, it has to be stated that according to prior art, an improved measurement of the individual echoes of an envelope curve of an echo signal depending on the type of filling product, is only then possible when a coarse manual differentiation on the filling level measuring device is carried out by an operator.

SUMMARY OF THE INVENTION

The present invention relates to a method and a device for carrying out an automatic coarse differentiation between a liquid or a bulk material of a filling product present in a receptacle. A possibility is therewith supposed to be created that a filling level measuring device working in particular on the pulse echo principle and scanning a reflected echo signal, automatically carries out a coarse differentiation between a liquid or a bulk material of the filling product.

In particular, according to a first exemplary embodiment of the present invention, a method for the coarse differentiation between a liquid and a bulk material of a filling product present in a receptacle is described, where a filling level measuring device is used scanning a reflected echo signal, and the coarse differentiation is made in dependence on the width of the individual echoes of an envelope curve in an echo signal.

According to a further exemplary embodiment of the present invention, a method for the coarse differentiation between a liquid and a bulk material of a filling product present in a receptacle using a filling level measuring device scanning an echo signal is described, where the coarse differentiation is made in dependence on the number of equidistant echoes in an echo signal.

According to yet another exemplary embodiment of the present invention, a method for the coarse differentiation between a liquid and a bulk material of a filling product present in a receptacle, using a filling level measuring device scanning an echo signal, is described, where the coarse differentiation is made in dependence on the detection of a stirring apparatus.

A preferred exemplary embodiment of a device according to the present invention for the coarse differentiation between a liquid and a bulk material of a filling product present in a receptacle, includes an arrangement for detecting the echo widths of echoes of a generated envelope curve, an arrangement for detecting the number of echoes having an echo width larger than a reference echo width, and the number of echoes having an echo width smaller than the reference echo width, and a signal outputting arrangement for the type of filling product, which signal outputting arrangement outputs a signal representative of a liquid when the number of echoes having an echo width larger than a reference echo width is greater than the number of echoes having an echo width smaller than a reference echo width.

A further preferred exemplary embodiment of a device according to the present invention for the coarse differentiation between a liquid and a bulk material of a filling product present in a receptacle, includes an arrangement for determining the number of equidistant echoes of a generated envelope curve, and an arrangement for outputting a signal determining the type of filling product in dependence on the determined number of equidistant echoes.

Still another preferred exemplary embodiment of a device according to the present invention for the coarse differentiation between a liquid and a bulk material of a filling product present in a receptacle, includes an arrangement for detecting a stirring apparatus by evaluating the echoes of a generated envelope curve, and an arrangement for outputting a signal representative of the type of filling product in dependence on the detection of a stirring apparatus.

Furthermore, according to yet another exemplary embodiment of the present invention, a filling level measuring device is described. The filling level measuring device utilizes a pulse echo principle which evaluates an envelope curve generated from the reflected echo signal, and including a device according to the above configurations. The device may also be modified according to one or more of the following configurations.

As indicated above, the present invention utilizes an idea of examining for the first time the individual echoes of an envelope curve for determined characteristics providing at least an indication as to the type of the filling product, namely liquid or bulk material. Thus, it is possible to make this coarse differentiation in dependence on the width of the individual signals of an envelope curve in an echo signal. Profit is thereby taken from the fact that, caused by the shape of a bulk material, wide echoes are more likely to occur in a product. When the filling product is a liquid, narrow echoes are more likely to occur in the envelope curve. By therewith relating the echo width of all echoes within an echo curve, or the echo image, to a predetermined reference echo width value, which is easy to fix by simple tests, then it can be concluded, if it is stated that the number of the wide echoes is larger than the number of the narrow echoes, that the filling product in question is a bulk material. Otherwise, it would be a liquid. Under circumstances, it is also purposeful to indicate that a mixture of these two basic types of filling products is concerned.

As an alternative hereto, it is yet also possible to examine the envelope curve for the fact how the distance between the individual echoes to be detected is relative to each other. Here, profit is taken from the effect that in case the filling product in question is a liquid, the echoes are more likely to occur at regular distances relative to each other. Hence, if it is stated that the echoes are present in the echo signal at regular distances, then it is possible to draw conclusions as to the type of the filling product. As an example, the case shall be mentioned that more than three equidistant echoes are detected. In this case, it is outputted that the filling product in question is a liquid.

A further alternative could consist in carrying out the coarse differentiation in dependence on the detection of a stirring apparatus. If a stirrer is recognized in the echo signal, then it may be concluded that the filling product concerned is a liquid.

It is of course also possible to combine one or more of the aforementioned alternatives for the coarse differentiation between a liquid or bulk material of the filling product, so as to increase the safety of recognizing the type of filling product. Further, it is of course also possible to lend weight to these separate alternatives with respect to each other, when they are combined, that is, to multiply them in each case with a predetermined (under circumstances even variable) factor. As a matter of course, these factors may be identical for any of the type of coarse differentiation described above, or may even be different. Through the corresponding weighting, the one or the other presented type of coarse differentiation may be imparted more or less weight.

The type of the coarse differentiation in dependence on the width of the individual echoes of an envelope curve can in particular be met in that the number of the echoes having a width larger than a reference echo width, and the number of the echoes having a width smaller than the reference echo width is ascertained. For the coarse differentiation, the ascertained larger echo number will then be referred to. Thus, as an example shall be mentioned here that in an envelope curve, four echoes are ascertained, which are larger than a reference echo width, and two echoes, which are smaller than the reference echo width. Then the coarse differentiation is made in that a bulk material is presumably concerned, since it is rather characteristic for a bulk material that the width of the echoes is larger than with a liquid.

An advantageous embodiment of this method hence provides that after the detection of the individual signals in the echo signal, the widths of individual echoes in an echo signal of an envelope curve are then ascertained by conventional (mathematical) means. Thereupon, the number of the echoes having a width greater than or equal to a reference echo width is ascertained. The number of the echoes having a width smaller than a reference echo width is likewise assessed. Thereupon, a signal determining the type of filling product is outputted in dependence on the echo widths, the number of which has been ascertained to be larger.

With the alternative for the coarse differentiation between bulk material or liquid of the filling product, wherein the equidistant echoes are ascertained in an echo signal, the distance between adjacent echoes in an envelope curve are in each case measured. Then, all echoes are preferably summarized which exhibit a distance relative to each other falling into a predetermined tolerance band (i.e. a distance range), hence equidistant echoes. The distance of the echoes is preferably calculated so that the respective locations of the maximum points of the individual echoes are determined, and the distance between these maximum points is measured. The tolerance band can be a fixed value range, e.g. ±0.1 m. It is in particular advantageous to take the first distance between the zero point and the first echo as the reference distance. In this case, it is for example advantageous to fix the tolerance range at ±50 cm, i.e. that all those echoes are considered to be equidistant echoes, the distance from each other is equal to the reference distance of ±50 cm. If another echo distance is fixed as the reference distance, then the tolerance band preferably has to be set to be smaller than ±50 cm.

In the further alternative for the coarse differentiation made with consideration of the ascertainment of a stirrer, echoes of an actual envelope curve are preferably compared with the corresponding echoes of the preceding envelope curve. Echoes from running stirrers are characterized in that their amplitude highly fluctuates, or that echoes having a large signal noise distance, i.e. the amplitude of the echo above the system noise or the dying-out transmission signal, periodically disappear and reappear. Such echoes can be marked and excluded from the filling level decision. In the present case, they are preferably used for a stirrer recognition and for accordingly outputting that the filling product in question is a liquid. Two envelope curves are in particular compared for determining the amplitude fluctuation of individual echoes, and the amplitude fluctuation thereof is compared to a reference value.

As explained above, the separate types of coarse differentiation as described before may be used individually or may be arbitrarily combined with each other. In this case, it is advantageous that the information of each type of filling product coarse differentiation is multiplied by a weighting factor, and the therefrom resulting values are added and divided by the sum of the weighting factors so as to ascertain a probability whether a liquid or a bulk material is concerned. In particular, it is then advantageous that the therefrom resulting value is compared to a reference value. If the ascertained value is, for example, smaller than this reference value, then a signal has to be outputted which is representative of liquid. In the other case, a signal has to be outputted which is representative of bulk material.

A corresponding device for the differentiation between a liquid or a bulk material of a filling product present in a receptacle, includes in an embodiment an arrangement for detecting the echo widths of echoes of a generated envelope curve, an arrangement for detecting the number of echoes having a width greater than a reference echo width, and the number of echoes having an echo width smaller than the reference echo width. Further, a signal outputting arrangement for the type of filling product is present, which outputs a signal representative of a liquid, when the number of echoes having an echo width larger than a reference echo width is greater than the number of echoes having an echo width smaller than a reference echo width.

An alternative exemplary embodiment according to the present invention includes an arrangement for detecting the number of equidistant echoes of a generated envelope curve, and an arrangement for outputting a signal determining the type of filling product in dependence on the detected number of equidistant echoes.

A further alternative exemplary embodiment of a device for the coarse differentiation between a liquid and a bulk material of a filling product present in a receptacle, is equipped with an arrangement for detecting a stirring apparatus by evaluating the echoes of a generated envelope curve, and an arrangement for outputting a signal representative of the type of filling product in dependence on the detection of a stirring apparatus.

A further preferred exemplary embodiment of the present invention may include one or more of the aforementioned arrangements, so that the different types of coarse differentiation are combined with each other. The individual arrangement work according to the above-described methods.

Finally, it has to be noted that the aforementioned methods can, for example, be implemented in an evaluation program for evaluating generated envelope curves.

Such evaluation programs are, for example, known under the trademark Echofox® of the company VEGA Grieshaber KG, Germany. Accordingly, methods and devices according to the present invention, or the correspondingly functioning software, can either be implemented in separate evaluation arrangement or, if desired, can be directly integrated in filling level measuring devices. Filling level measuring devices of the type interesting here, for the remainder, are all known filling level measuring devices, which scan a reflected echo signal, i.e. which generate en envelope curve. Such filling level measuring devices are, for example, ultrasonic filling level measuring devices or radar filling level measuring devices, in particular, so-called pulse radar filling level measuring devices.

BRIEF DESCRIPTION OF THE DRAWINGS

For the further explanation and the better understanding, several embodiments of the present invention are described in more detail in the following with reference to the attached drawings. Therein show.

DESCRIPTION OF PREFERRED EMBODIMENTS OF THE INVENTION

Figure 1:
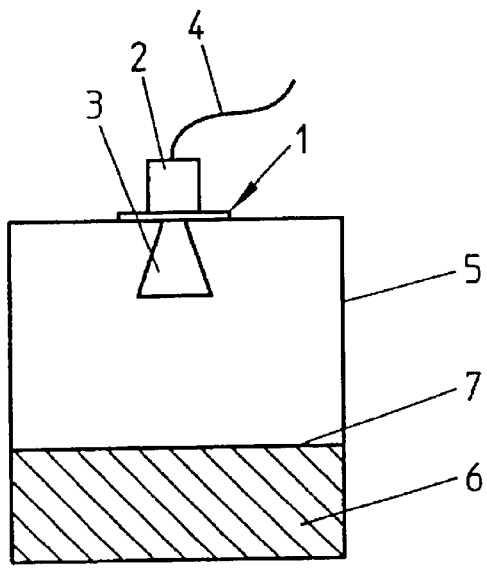
FIG. 1 shows a filling level measuring device mounted in a cover zone of a receptacle according to the present invention.

FIG. 1 shows a filling level measuring device 1 is mounted in the top zone of a receptacle 5. Situated in receptacle 5 is a filling product 6, a liquid or a bulk material, forming a filling product surface 7.

The filling level measuring device 1 mounted in receptacle 5 includes a housing 2 and an antenna 3. Via a cable 4, in particular a so-called 4–20 mA two-wire loop, the filling level measuring device 1 is connected to a power supply unit and a communication unit (not shown here).

Figure 2:
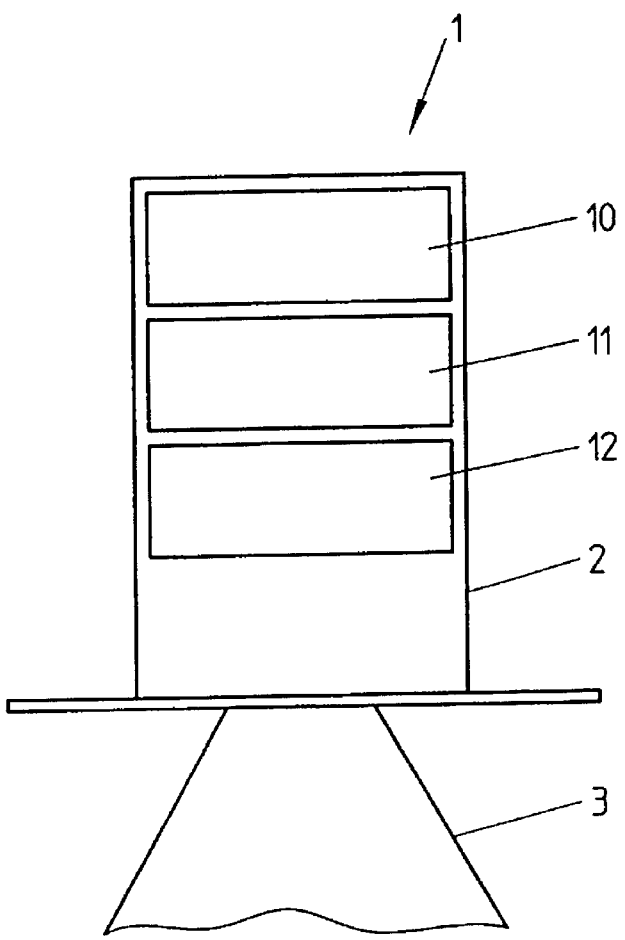
FIG. 2 shows the filling level measuring device including various electronic units.

FIG. 2 shows the filling level measuring device 1 having an evaluation arrangement 10, a transmitting arrangement 11, and a receiving arrangement 12. Using transmitting arrangement 11, short radar pulses in the microwave range are sent into the direction of the filling product surface 7 via antenna 3. These signals are reflected on the filling product surface 7, and are received over the same antenna 3. In receiving arrangement 12, these are processed according to the state of the art, and are evaluated in the evaluation arrangement 10. For this purpose, an envelope curve is formed from the individual echo signals in a conventional manner. This envelope curve is then in turn more closely examined using mathematical methods, in particular such as it is illustrated in the following flow charts.

Figure 3:
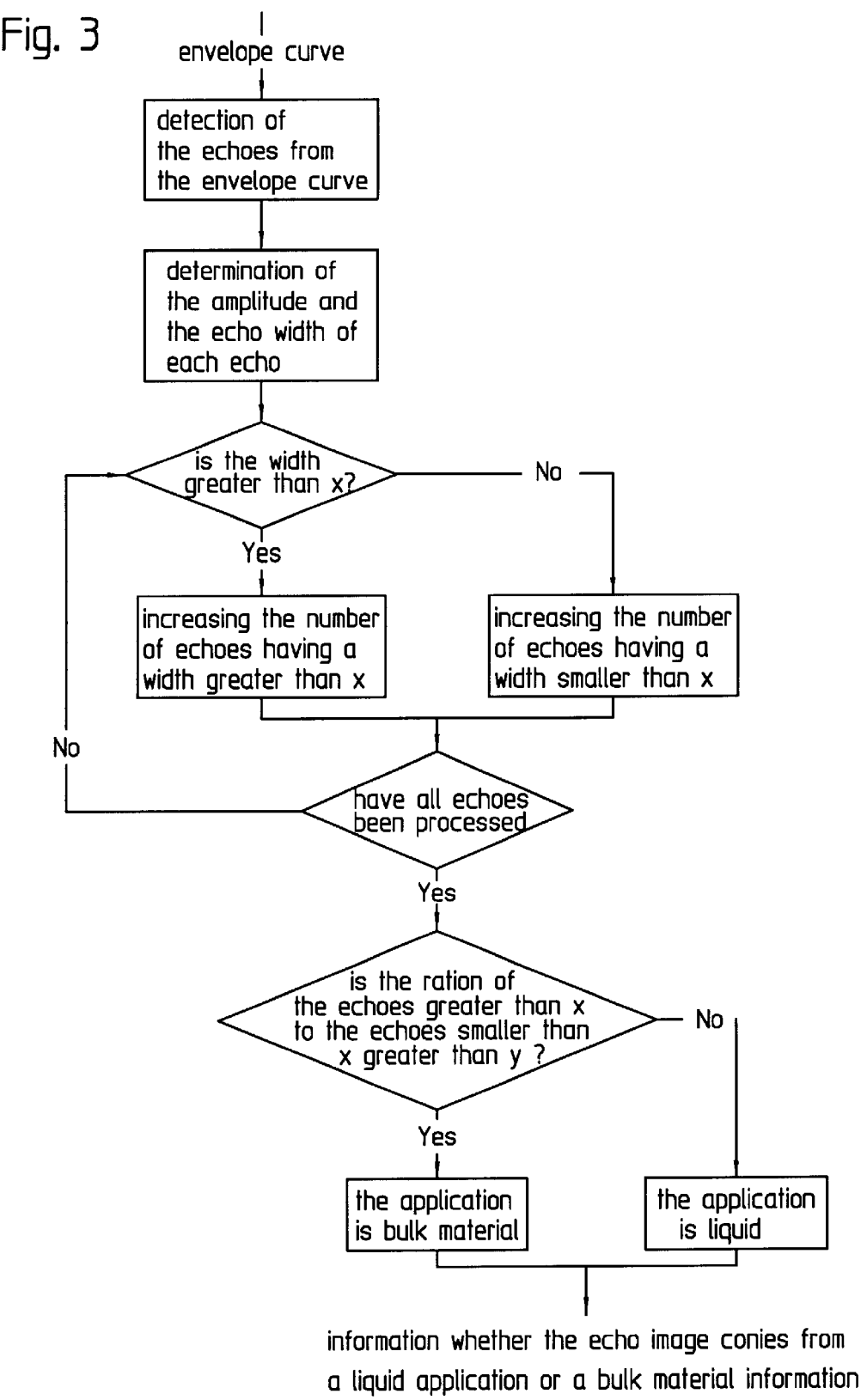
FIG. 3 shows a flow chart illustrating a type of the coarse differentiation between a liquid or a bulk material using echo widths.

In FIG. 3, a first type of coarse differentiation between a liquid or a bulk material using the echo widths of the individual echoes of an envelope curve is illustrated. As can therefrom be seen, the envelope curve is mathematically processed, so that the individual echoes of the envelope curve are detected. Then, the amplitude of the individual echoes, as well as the echo width thereof, is ascertained. In an iteration loop, it is then each time ascertained whether the width of an echo is greater or smaller than a reference value x. When all echoes have been processed, the relation of the number of echoes greater than x to the number of echoes smaller than x is compared to a further reference value y. If the mentioned relation of the echo widths is greater than this second reference value, the information will be outputted that a bulk material is concerned. Otherwise, it will be outputted that in this application, a liquid is concerned. Of course, it is also possible to use directly the larger number of echoes, instead of putting the number of the echoes having a width larger than x into a relation to the number of the echoes smaller than x, so as to make a statement as to the type of filling product.

According to this exemplary embodiment of the present invention, the reference value x in question is a threshold value using which the determination of the echo width ensues for classifying each echo into liquid or bulk material. The second reference value y concerned, is a threshold value of the relation of all echoes having an echo width larger than x to all echoes having an echo width smaller than x for classifying the echo image into liquid or bulk material.

Figure 4:
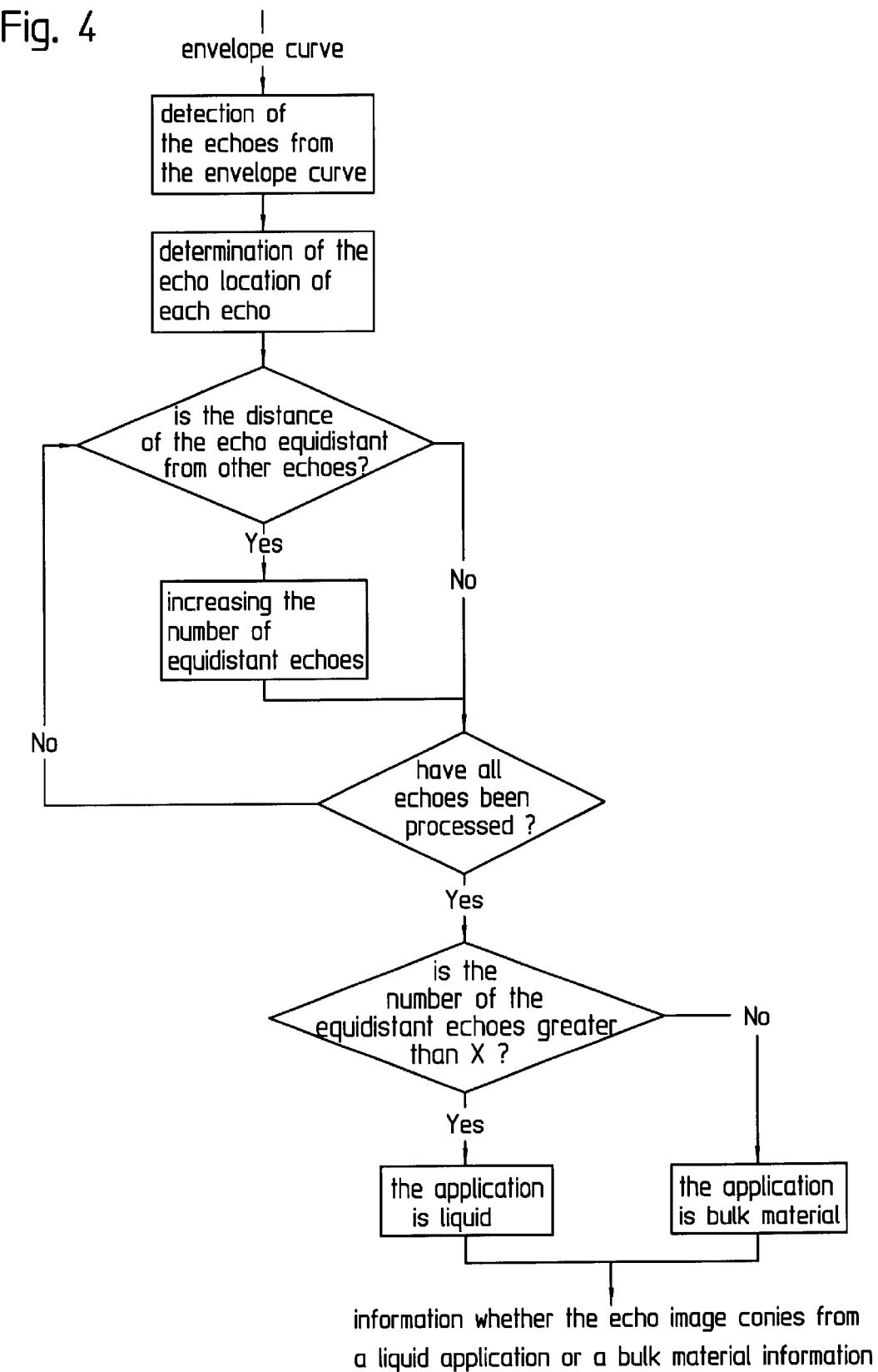
FIG. 4 shows a flow chart illustrating a type of the coarse differentiation between a liquid or a bulk material using the detection of equidistant echoes.

In the exemplary embodiment, illustrated in FIG. 4, of a method according to the present invention for the coarse differentiation between a liquid or a bulk material of the filling product using the echo locations, the envelope curve on individual echoes is in turn detected. Then, the echo location of each echo is ascertained, e.g. by determining the locations of the maximum points of the echoes. Then, the distance of each echo from another echo is measured and checked whether the distance corresponds to a distance already ascertained (whether at least the difference is within a determined tolerance band). Again, an iteration ensues until all echoes have been processed, so that at the end of this iteration, the number of the equidistant echoes are present in the echo image. The number of the equidistant echoes is then compared to a reference value x. If the number is larger than this reference value, it is outputted, that a liquid is concerned; if this comparison has to be negated, it is outputted that a bulk material is concerned.

Figure 5:
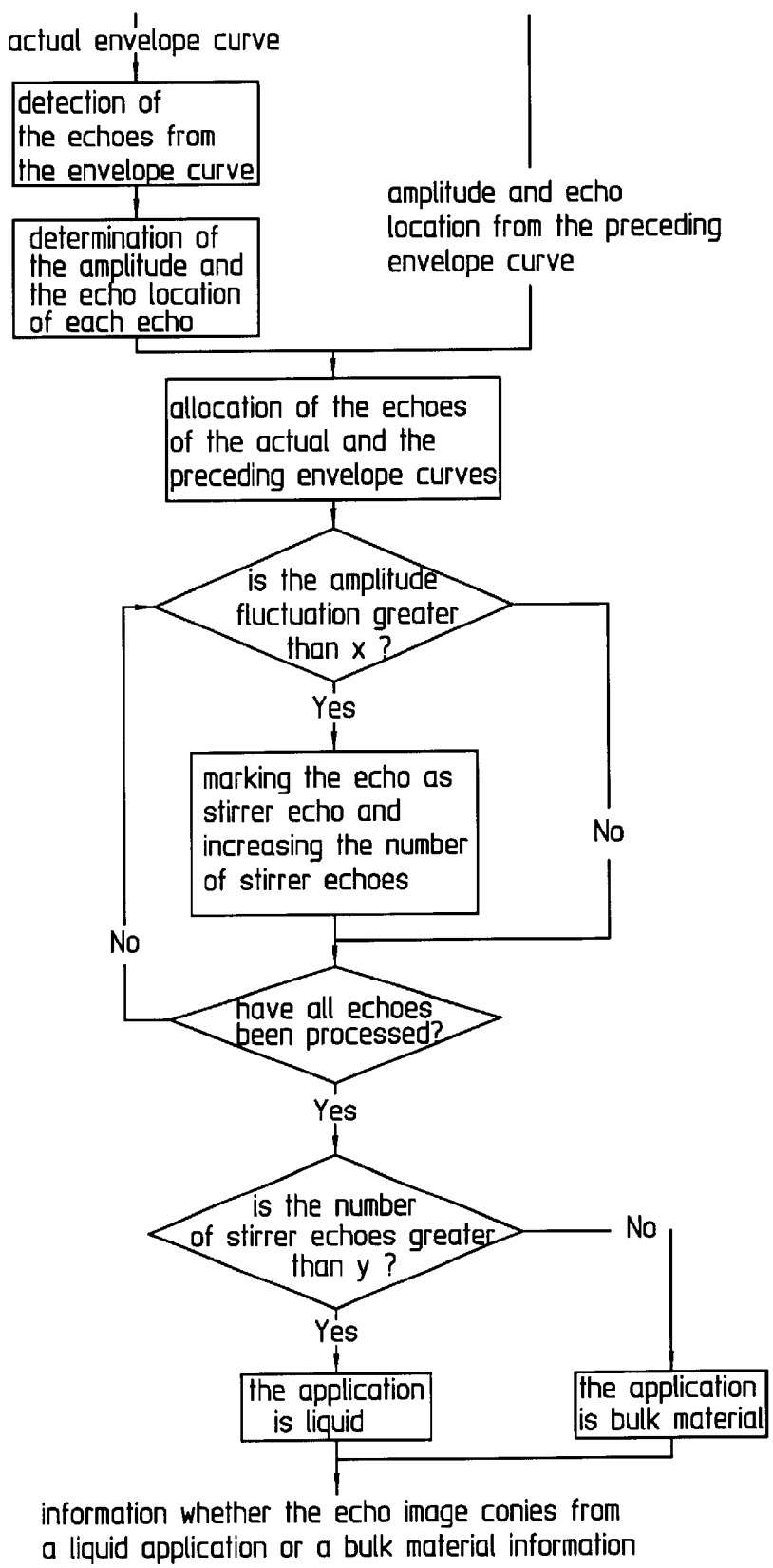
FIG. 5 shows a flow chart illustrating a type of the coarse differentiation between a liquid or a bulk material using the detection of a stirring apparatus.

In FIG. 5, a flow chart for detecting a stirring apparatus is illustrated. As before, the actual envelope curve on individual echoes is here detected, as well. Then, the amplitude and the echo location of each echo is ascertained. Then, these data are memorized. Then ensues an allocation of the actual envelope curve and the preceding envelope curve or the second last envelope curve, etc. (e.g., of even plural previous envelope curves). From this, the amplitude fluctuation is determined. If this amplitude fluctuation is larger than a reference value x, then an addition with a previously given value is carried out. This again ensues while processing a type of iterative loop, so that all echoes are processed. Then, the interrogation ensues whether the number of the echo ascertained as the stirrer echo, is larger than a further reference value Y. If this has to be answered positive, then it is outputted that a liquid is concerned, otherwise it is outputted that a bulk material is concerned.

Finally, the reference value x is a threshold value for the amplitude fluctuation of an echo over the time for deciding whether an echo is accepted as the stirrer echo. The reference value y is a threshold value for the number of the stirrer echoes for classifying the echo image into a liquid or a bulk material.

Figure 6:
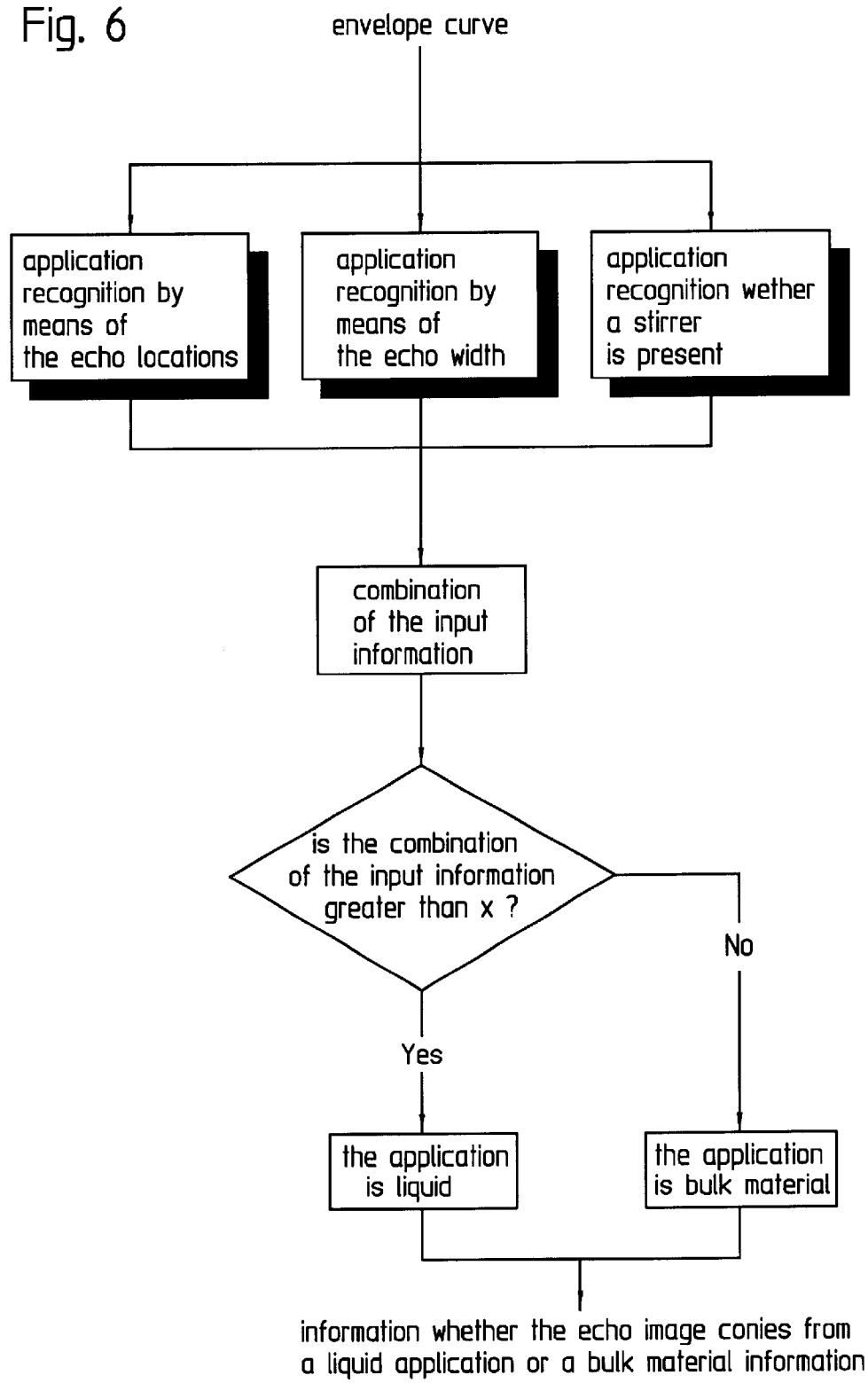
FIG. 6 shows a flow chart illustrating a combination of the various types of coarse differentiation between a liquid and a solid.

In FIG. 6, a combination of the aforementioned types of the coarse differentiation is illustrated. Hence, all of the three above-described types of coarse differentiation ensue here. These input data are in turn combined with each other, e.g. by a weighting, which will still be explained in more detail in the following. Then, the therefrom determined combination value is compared to a reference value x. If it has to be stated that the determined value is larger than the reference value, then it is outputted that a liquid is concerned, otherwise it is outputted that a bulk material is concerned.

Hence, it has to be stated that here the data of the individual application recognitions are combined, and that therewith, the individual recognitions do not have a YES/NO decision in the end, but a probability as to how the echo image matches the application (e.g. 0%=for sure liquid, or 100%=for sure bulk material). The combination of the input information can, for example, be carried out by the following formula:

$$\frac{Info1 \times weighting1 + Info2 \times weighting2 + Info3 \times weighting3}{weighting1 + weighting2 + weighting3}$$

As a special case, weighting 1 and/or weighting 2 and/or weighting 3 may be adopted with a value 0. This means that only one selection of the ingoing data is used.

Figure 7:
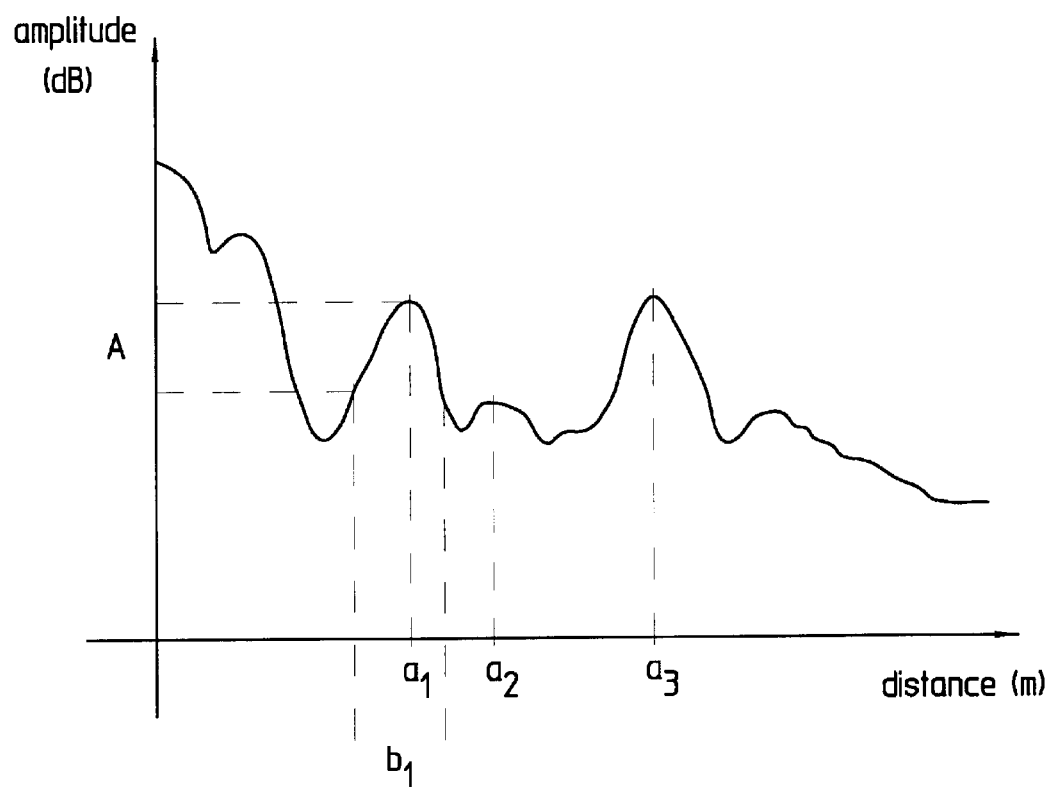
FIG. 7 shows an exemplary envelope curve from individual echoes and the echo characteristics to be detected therein.

Finally, by way of example, an envelope curve is still illustrated in FIG. 7, in which envelope curve several echoes are to be detected. The individual echo locations are $a_1$, $a_2$, $a_3$. In this example, the distances between the individual echoes differ relative to each other, so that the number of the equidistant echoes has to be taken as zero. The width of the echoes is assessed using fixed parameters, e.g. a determined amplitude value prior and subsequent to the determined echo maximum is used for this purpose. The width of the echo is then the intermediate distance. Here, the echo width is hence predefined by a predetermined noise value A from the maximum points. From there results the echo width $b_1$ for the echo having the echo location $a_1$.

What is claimed is:

1. A method for determining a coarse differentiation between a liquid and a bulk material of a filling material in a receptacle, the method comprising the steps of:

sending an initial signal to the surface of the filling material;

receiving an echo signal resulting from a reflection of the initial signal from the surface of the filling material using the filling level measuring device;

analyzing the echo signal to determine a number of equidistant echoes in the echo signal;

determining the coarse differentiation between the liquid and the bulk material as a function of the number of equidistant echoes in the echo signal; and outputting a signal indicative of the coarse determination.

2. The method of claim 1, wherein the number of equidistant echoes is determined by the following substeps:

detecting the echoes from an envelope curve;

determining an echo location of each echo; and measuring a distance between adjacent echoes and counting adjacent echoes having the distance within a predetermined tolerance band.

3. The method of claim 2, further comprising the step of:

comparing the number of equidistant echoes to a reference number;

outputting, when the number of equidistant echoes is greater than the reference number, a signal indicative of a presence of liquid in the receptacle; and outputting, when the number of equidistant echoes is less or equal than the reference number, a signal indicative of a presence of a bulk material in the receptacle.

4. The method of claim 1, wherein in the determining step, the coarse differentiation is determined as a function of the number of equidistant echoes in an envelope curve of the echo signal and a width of each echo in the envelope curve of the echo signal.

5. The method of claim 4, wherein the step of determining the coarse differentiation comprises the substep of:

determining a ratio of the echoes having a width greater than a reference value to the echoes having a width smaller than the reference value.

6. The method of claim 4, further comprising the step of:

multiplying a corresponding type of the coarse differentiation by a weighting factor, wherein the coarse differentiation distinguishes between filling materials composed of liquid, bulk material and a mixture of liquid and bulk material as a function of the following formula:

$$TCD = \frac{Info1 \times weighting1 + Info2 \times weighting2}{weighting1 + weighting2}$$

wherein TCD is a Total Coarse Differentiation,

Info1 is a first coarse differentiation determined as a function of the number of equidistant echoes in the echo signal, Info2 is a second coarse differentiation determined as a function of the width of each echo in the envelope curve of the echo signal, weighting1 is a first value between 0 and 1, weighting2 is a second value between 0 and 1.

7. The method of claim 1, further comprising the steps of:

detecting a presence of a stirring apparatus in the receptacle using a filling level measuring device; and determining the coarse differentiation as a function of the number of equidistant echoes in an envelope curve of the echo signal and a presence of a stirring apparatus.

8. The method of claim 7, wherein the presence of the stirring apparatus is determined based on a comparison of a first echo envelope curve to a second previous echo envelope curve.

9. The method of claim 8, further comprising the steps of:

determining an amplitude fluctuation by comparing the first and second envelope curves;

comparing the amplitude fluctuation to a reference value; and when the amplitude fluctuation is greater than the reference value, outputting a signal indicative of the stirring apparatus.

10. The method of claim 7, further comprising the step of:

multiplying a corresponding type of the coarse differentiation by a weighting factor, wherein the coarse differentiation distinguishes between filling materials composed of liquid, bulk material and a mixture of liquid and bulk material as a function of the following formula:

$$TCD = \frac{Info1 \times weighting1 + Info3 \times weighting3}{weighting1 + weighting3}$$

wherein TCD is a Total Coarse Differentiation,

Info1 is a first coarse differentiation determined as a function of the number of equidistant echoes in the echo signal, Info3 is a third coarse differentiation determined as a function of the presence of a stirring apparatus in the receptacle, weighting1 is a first value between 0 and 1, and weighting3 is a third value between 0 and 1.

11. The method of claim 1, wherein in the determining step, the coarse differentiation is determined as a function of (a) the number of equidistant echoes, (b) the number of equidistant echoes in the echo signal, and (c) a presence of a stirring apparatus in the receptacle.

12. The method of claim 11, wherein the coarse differentiation distinguishes between filling materials composed of liquid, bulk material and a mixture of liquid and bulk material as a function of the following formula:

$$TCD = \frac{Info1 \times weighting1 + Info2 \times weighting2 + Info3 \times weighting3}{weighting1 + weighting2 + weighting3}$$

wherein TCD is a Total Coarse Differentiation,

Info1 is a first coarse differentiation determined as a function of the width of each echo in the envelope curve of the echo signal, Info2 is a second coarse differentiation determined as a function of the number of equidistant echoes in the echo signal, Info3 is a third coarse differentiation determined as a function of the presence of a stirring apparatus in the receptacle, weighting1 is a first value between 0 and 1, weighting2 is a second value between 0 and 1, and weighting3 is a third value between 0 and 1.

13. A device for determining a coarse differentiation between one of a liquid and a bulk material of a filling material in a receptacle, comprising:

a signal device sending an initial signal to a surface of the filling material and receiving an echo signal resulting from a reflection of the initial signal from the surface;

a first arrangement generating an envelope curve as a function of the reflected echo signal and detecting a number of equidistant echoes from the envelope curve; and a second arrangement outputting a signal indicative of a coarse differentiation, the coarse differentiation being determined as a function of the detected number of equidistant echoes.

14. The device of claim 13, wherein the first arrangement measures a distance between adjacent echoes and counts adjacent echoes having a distance of separation within a predetermined tolerance band.

15. The device of claim 13, further comprising:

a third arrangement detecting a width of each of the echoes of the generated envelope curve, wherein the second arrangement outputs a signal indicative of a coarse differentiation, the coarse differentiation being determined as a function of the detected number of equidistant echoes and the width of the echoes.

16. The device of claim 15, wherein the third arrangement detects a first number of echoes having an echo width greater than a reference echo width and a second number of echoes having an echo width smaller than the reference echo width.

17. The device of claim 13, further comprising:

a fourth arrangement detecting a presence of a stirring apparatus in the receptacle, wherein the second arrangement outputs a signal representative of a presence of liquid as a function of the detected number of equidistant echoes, and of the presence of a stirring apparatus.

18. The device of claim 17, wherein the forth arrangement compares first echoes of a first envelope curve to second echoes of a second envelope curve, the second envelope curve preceding the first envelope curve.

19. The device of claim 18, wherein the forth arrangement compares the first and second envelope curves to detect an amplitude fluctuation and compares the amplitude fluctuation to a reference value.

20. The device of claim 13, further comprising:

a fifth arrangement detecting a presence of a stirring apparatus in the receptacle, wherein the second arrangement outputs a signal representative of a presence of liquid as a function of the detected number of equidistant echoes, the width of the echoes, and the presence of the stirring apparatus.

21. The device of claim 13, wherein the device is incorporated in a filling level measuring device, the measuring device working according to a pulse echo principle and evaluating an envelope curve generated from a reflected echo signal.

* * * * *